United States Patent
Guillen et al.

(10) Patent No.: US 12,138,687 B2
(45) Date of Patent: Nov. 12, 2024

(54) METHODS OF FORMING ARTICLES INCLUDING MICROCHANNELS THEREIN, AND RELATED ARTICLES

(71) Applicant: Battelle Energy Alliance, LLC, Idaho Falls, ID (US)

(72) Inventors: Donna P. Guillen, Idaho Falls, ID (US); Robert V. Fox, Idaho Falls, ID (US); Dennis S. Tucker, Idaho Falls, ID (US); Troy B. Holland, New Albany, IN (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 18/486,790

(22) Filed: Oct. 13, 2023

(65) Prior Publication Data

US 2024/0131590 A1  Apr. 25, 2024
US 2024/0227017 A9  Jul. 11, 2024

Related U.S. Application Data

(60) Provisional application No. 63/380,458, filed on Oct. 21, 2022.

(51) Int. Cl.
  *B22F 10/62* (2021.01)
  *B22F 10/43* (2021.01)
  *B33Y 10/00* (2015.01)

(52) U.S. Cl.
  CPC .............. *B22F 10/62* (2021.01); *B22F 10/43* (2021.01); *B33Y 10/00* (2014.12)

(58) Field of Classification Search
  CPC ...... B22F 10/62; B22F 10/43; B22F 2999/00; B33Y 10/00; B33Y 80/00; F28F 3/12; F28F 3/00
  See application file for complete search history.

(56) References Cited

U.S. PATENT DOCUMENTS

| 6,375,880 B1 | 4/2002 | Cooper et al. |
| 7,946,035 B2 | 5/2011 | Thompson |
| 10,648,082 B1 | 5/2020 | Martin et al. |

(Continued)

FOREIGN PATENT DOCUMENTS

| EP | 3837108 A1 | 6/2021 |
| WO | 2020/018815 A1 | 1/2020 |

OTHER PUBLICATIONS

"DOE-EERE Advanced Manufacturing Office Multi-Year Program Plan for Fiscal Years 2017 Through 2021, Dec. 2016", (https://www.energy.gov/eere/amo/articles/advanced-manufacturing-office-amo-multi-year-program-plan-fiscal-years-2017), 155 pages.

(Continued)

*Primary Examiner* — Lawrence Averick
(74) *Attorney, Agent, or Firm* — TraskBritt

(57) ABSTRACT

A method of forming an article comprises forming a feed material around one or more shapeholders and sintering the feed material and the one or more shapeholders to form a sintered article comprising the one or more shapeholders in a base material. The sintered article is exposed to a solvent to remove the one or more shapeholders from the base material. Additional methods are disclosed, as well as articles including one or more microchannels exhibiting a diameter of from about 5 μm to about 10 mm.

17 Claims, 6 Drawing Sheets

(56) References Cited

U.S. PATENT DOCUMENTS

| | | | |
|---|---|---|---|
| 11,383,302 B2* | 7/2022 | Van Rooyen | B33Y 10/00 |
| 11,504,770 B2* | 11/2022 | Hildreth | C25F 3/00 |
| 11,845,132 B2* | 12/2023 | van Rooyen | F28D 7/06 |
| 2005/0113603 A1* | 5/2005 | Belmonte | B01D 3/14 |
| | | | 562/408 |
| 2018/0050486 A1 | 2/2018 | Talgorn et al. | |
| 2019/0314895 A1* | 10/2019 | Hildreth | C25F 3/00 |
| 2020/0062877 A1 | 2/2020 | Knopf et al. | |
| 2020/0094322 A1* | 3/2020 | Van Rooyen | F28D 7/06 |
| 2020/0144635 A1* | 5/2020 | Hall | H01M 8/2457 |
| 2022/0324024 A1* | 10/2022 | van Rooyen | B28B 1/001 |

OTHER PUBLICATIONS

Abbott et al., "Novel Ambient Temperature Ionic Liquids for Zinc and Zinc Alloy Electrodeposition", Transactions of the IMF, The International Journal of Surface Engineering and Coatings, vol. 79, No. 6, (2001), 4 pages.

Anselmi-Tamburini et al., "Critical Assessment 28: Electrical Field/Current Application—A Revolution in Materials Processing/Sintering?", Materials Science and Technology, vol. 33, No. 16, (2017), 9 pages.

Endres et al., "Electrodeposition of Nanocrystalline Metals and Alloys From Ionic Liquids", Angew. Chem. Int. Ed., vol. 42, No. 29, (2003), 3 pages.

Endres et al., "Electrodeposition of Nanoscale Metals and Semiconductors in Ionic Liquids", Proceedings of the Electrochemical Society, PV 2004-24, (2004), 10 pages.

Endres, Frank, "Ionic Liquids: Solvents for the Electrodeposition of Metals and Semiconductors", ChemPhysChem, vol. 3, No. 2, (2002), 11 pages.

Glukhov et al., "Electrodeposition of Rare Earth Metals Y, Gd, Yb in Ionic Liquids", Russian Journal of Physical Chemistry A, vol. 84, No. 1, (2010), 5 pages.

Gonzalez-Julian et al., "Unveiling the Mechanisms of Cold Sintering of ZnO at 250° C by Varying Applied Stress and Characterizing Grain Boundaries by Kelvin Probe Force Microscopy", Acta Materialia, vol. 144, (2018), 13 pages.

Green et al., "Constrained Sintering: A Delicate Balance of Scales", Journal of the European Ceramic Society, vol. 28, (2008), 16 pages.

Hirt et al., "Additive Manufacturing of Metal Structures at the Micrometer Scale", Advanced Materials, vol. 29, No. 17, (2017), 30 pages.

Kato et al., "BaTiO3 Nanocube and Assembly to Ferroelectric Supracrystals", J. Mater. Res., vol. 28, No. 21, Nov. 14, 2013, 14 pages.

Kellett et al., "Thermodynamics of Densification: I, Sintering of Simple Particle Arrays, Equilibrium Configurations, Pore Stability, and Shrinkage", J. Am. Ceram. Soc., vol. 72, No. 5, (1989), 10 pages.

Kermani et al., "Flash Cold Sintering: Combining Water and Electricity", Journal of the European Ceramic Society, vol. 40, (2020), 6 pages.

Lange et al., "Thermodynamics of Densification: II, Grain Growth in Porous Compacts and Relation to Densification", J. Am. Ceram. Soc., vol. 72, No. 5, (1989), 7 pages.

Macek Kržmanc et al., "The Morphology Control of BaTiO3 Particles Synthesized in Water and a Water/Ethanol Solvent", J. Am. Ceram. Soc., vol. 96, No. 11, (2013), 9 pages.

Nockemann et al., "Task-Specific Ionic Liquid for Solubilizing Metal Oxides", J. Phys. Chem. B., vol. 110, No. 42, (2006), 15 pages.

Orrù et al., "Consolidation/Synthesis of Materials By Electric Current Activated/Assisted Sintering", Materials Science and Engineering R, vol. 63, (2009), 161 pages.

Pint, B.A., "Critical Assessment 4: Challenges in Developing High Temperature Material", Materials Science and Technology, vol. 30, No. 12, (2014), 6 pages.

Quach et al., "Fundamentals and Applications of Field/Current Assisted Sintering", In Sintering of Advanced Materials, Z. Fang, Ed., Cambridge Woodhead Publishing, 2010, 26 pages.

Wang et al., "Approaches for Co-Sintering Metal-Supported Proton-Conducting Solid Oxide Cells With Ba(Zr, Ce, Y, Yb)O3-d Electrolyte", Int. J. Hydrog. Energy, vol. 44, No. 26, May 2019, 27 pages.

* cited by examiner

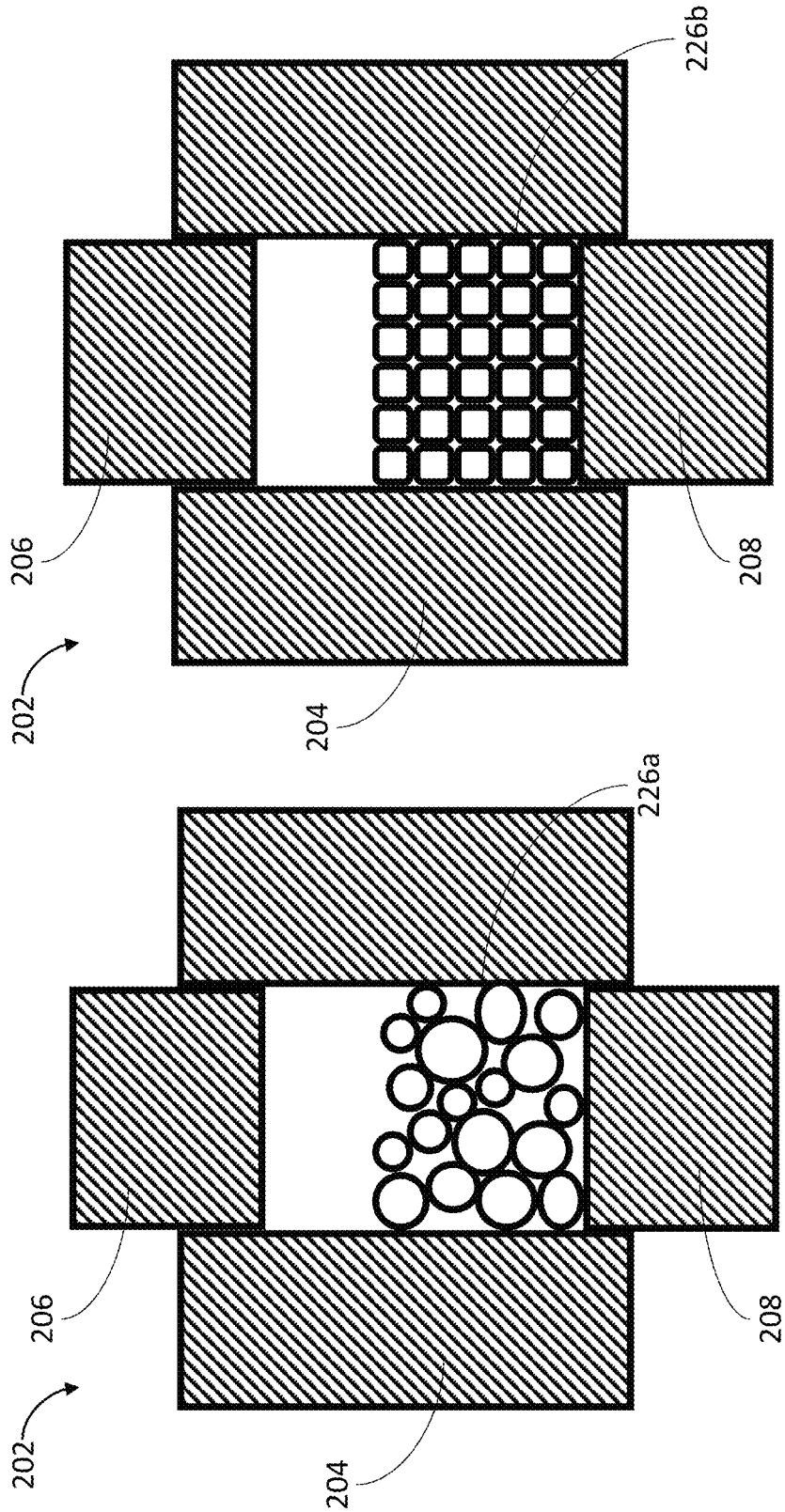

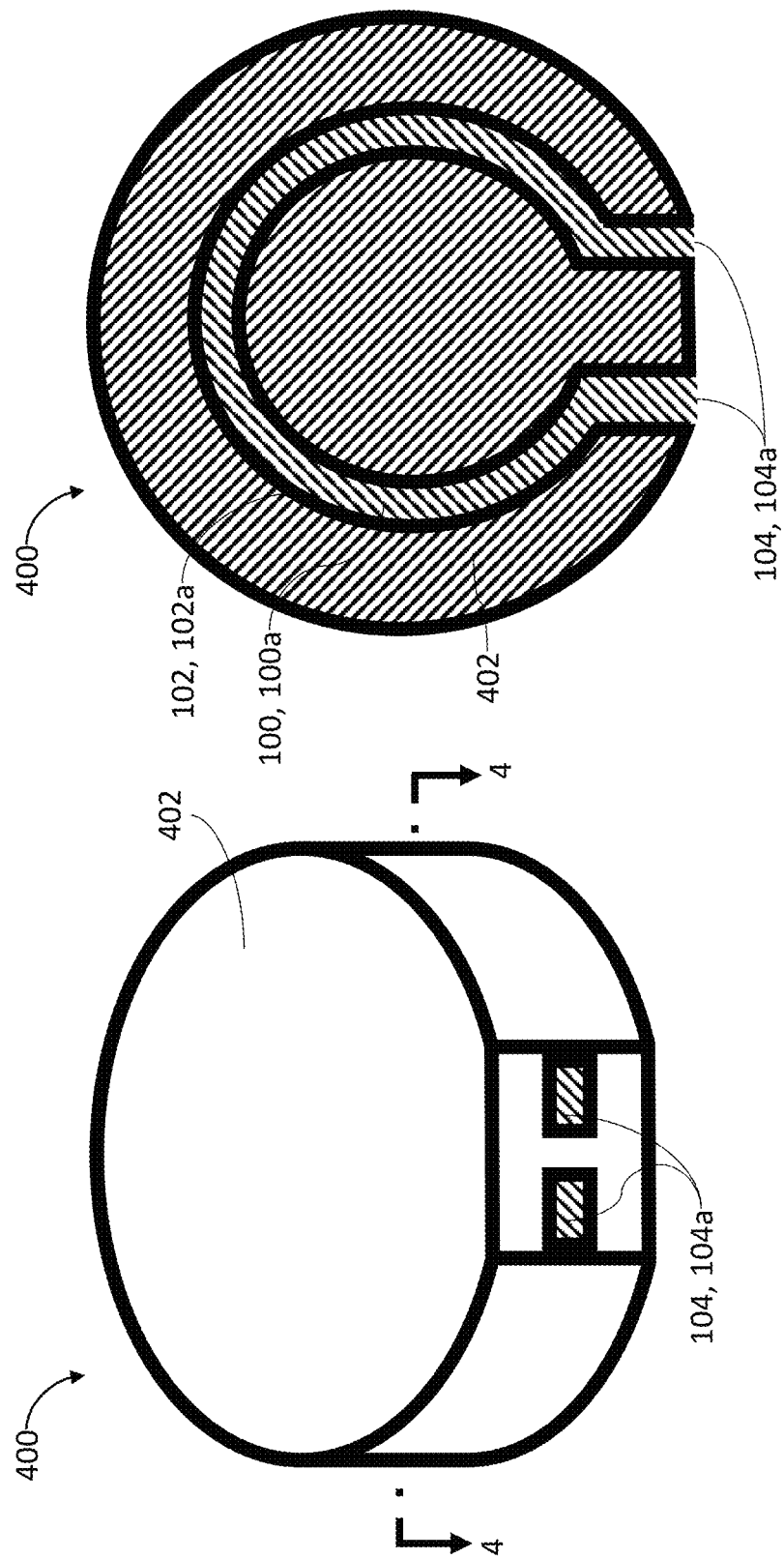

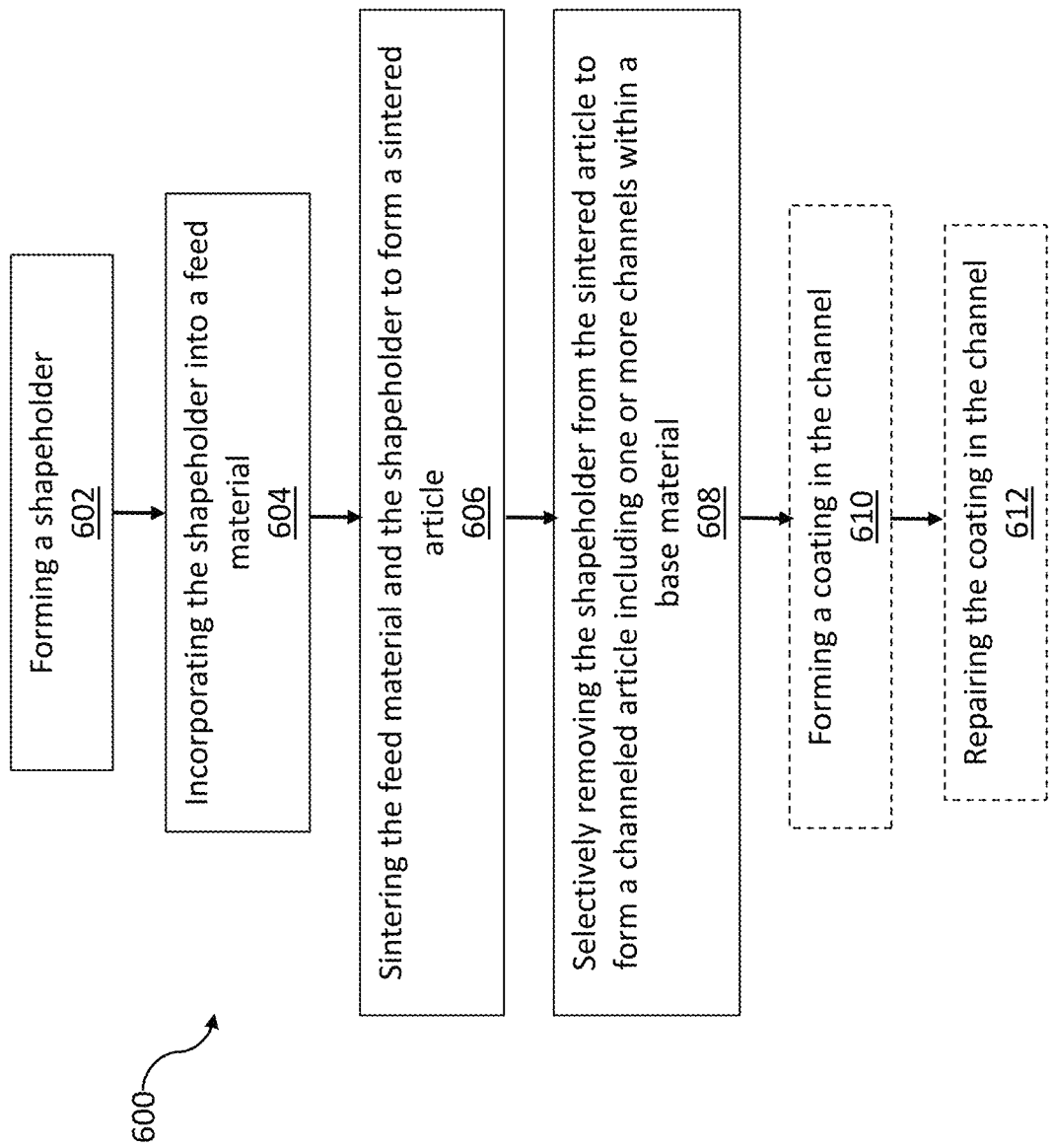

METHODS OF FORMING ARTICLES INCLUDING MICROCHANNELS THEREIN, AND RELATED ARTICLES

CROSS-REFERENCE TO RELATED APPLICATION

This application claims the benefit under 35 U.S.C. § 119(e) of U.S. Provisional Patent Application Ser. No. 63/380,458, filed Oct. 21, 2022, the disclosure of which is hereby incorporated herein in its entirety by this reference.

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

The disclosure relates to articles having channels within the article and to methods of forming the articles. More specifically, the disclosure relates to channeled articles having channels of complex geometries and to methods of forming the channeled articles.

BACKGROUND

Articles having channels (e.g., microchannels) may be useful in many industries (e.g., aerospace and land-based power turbine industries). However, economic and technical barriers exist for the widespread adoption of channeled articles formed by conventional processes. For example, the formation of the channeled articles may result in larger channels, simplified geometries of the channels, and high energy usage resulting from the high fabrication temperatures used to form the channeled articles. Some powder-based material manufacturing techniques have been shown to have cost, energy, and rate benefits over conventional processes. However, there are significant drawbacks to these processing techniques that have prevented wide-scale industry adoption. For example, high sintering temperatures are used for refractory materials, there are deleterious reactions between the materials and tooling/other materials during the sintering, high pressure requirements, and poor multi-material co-sintering performance.

BRIEF SUMMARY

A method of forming an article is disclosed and comprises forming a feed material around one or more shapeholders, sintering the feed material and the one or more shapeholders to form a sintered article comprising the one or more shapeholders in a base material, and exposing the sintered article to a solvent to remove the one or more shapeholders from the base material.

A method of forming an article is disclosed and comprises forming one or more shapeholders by additive manufacturing and incorporating the one or more shapeholders into a feed material. One or more of pressure or electrical current are applied to the feed material and the one or more shapeholders to form a sintered article that comprises the one or more shapeholders within a base material. The sintered article is exposed to an ionic liquid to form one or more microchannels in the base material, the one or more microchannels corresponding to a negative image of the one or more shapeholders.

An article is also disclosed and comprises a base material defining one or more microchannels therein, the one or more microchannels exhibiting a diameter of from about 5 μm to about 10 mm. A coating is on an internal surface of the one or more microchannels. One of the base material and the coating comprises a metal and the other of the base material and the coating comprises a metal oxide.

BRIEF DESCRIPTION OF THE DRAWINGS

FIG. 3A is cross sectional view of a die assembly of the sintering assembly of FIG. 2 with an enlarged representation of a feed material within the die assembly;

FIG. 3B is cross sectional view of a die assembly of the sintering assembly of FIG. 2 with an enlarged representation of shape-controlled nanoparticles within the die assembly;

FIG. 4A is a perspective view of a sintered article including the shapeholder of FIG. 1A in a base material;

FIG. 4B is a cross sectional view of the sintered article of FIG. 4A taken along line 4-4;

FIG. 6 is a flow diagram of a method of forming a channeled article according to embodiments of the disclosure.

DETAILED DESCRIPTION

Figures 1A, 1B:
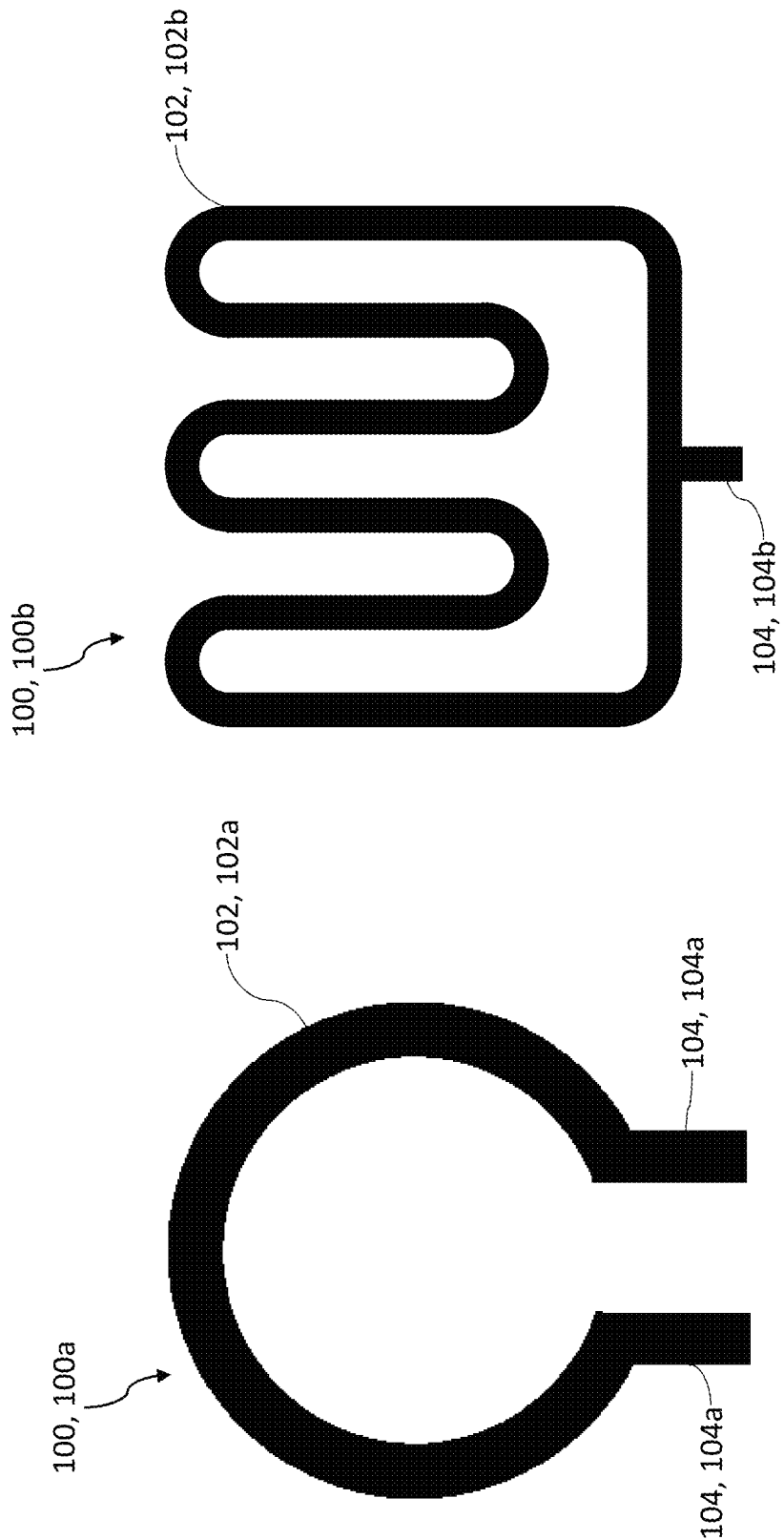
FIGS. 1A and 1B are plan views of shapeholders according to embodiments of the disclosure.

The following description provides specific details, such as material compositions, shapes, sizes, and process conditions to provide a thorough description of embodiments of the disclosure. However, a person of ordinary skill in the art would understand that the embodiments of the disclosure may be practiced without employing these specific details. Indeed, the embodiments of the disclosure may be practiced in conjunction with conventional techniques employed in the industry.

Drawings presented herein are for illustrative purposes only and are not meant to be actual views of any particular material, component, structure, article, or system. Variations from the shapes depicted in the drawings as a result, for example, of manufacturing techniques and/or tolerances, are to be expected. Thus, embodiments described herein are not to be construed as being limited to the particular shapes or configurations as illustrated, but include deviations in shapes of configurations that result, for example, from manufacturing. For example, a shape illustrated or described as box-shaped may have rough and/or nonlinear features, and a shape illustrated or described as round may include some rough and/or linear features. Moreover, sharp angles that are illustrated may be rounded, and vice versa. Thus, the shapes or configurations illustrated in the figures are schematic in nature, and their shapes or configurations are not intended to illustrate the precise shape of an article or component and do not limit the scope of the present claims. The drawings are not necessarily to scale. Additionally, elements common between figures may retain the same numerical designation.

As used herein, the singular forms "a," "an," and "the" are intended to include the plural forms as well, unless the context clearly indicates otherwise.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

As used herein, the term "and/or" means and includes any and all combinations of one or more of the associated listed items.

As used herein, relational terms, such as "beneath," "below," "lower," "bottom," "above," "upper," "top," "front," "rear," "left," "right," and the like, may be used for ease of description to describe one element's or feature's relationship to another element(s) or feature(s) as illustrated in the drawings. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the term "ceramic" means and includes an inorganic, non-metallic material comprising metal, non-metal, or metalloid atoms primarily held in ionic and covalent bonds. The ceramic may include, but is not limited to, a metal oxide, a metal nitride or a metal carbide material.

As used herein, the term "cermet" means and includes a composite material including a ceramic material and a metal material.

As used herein, the terms "configured" and "configuration" refers to a size, a shape, a material composition, a material distribution, orientation, and arrangement of at least one feature (e.g., one or more of at least one structure, at least one material, at least one region, at least one device) facilitating use of the at least one feature in a pre-determined way.

As used herein, the term "feed material" means and includes a solid material not yet at a desired densified (e.g., sintered) state. The feed material may comprise a loose (e.g., flowable) solid material, such as a powder, particles, flakes, or other solid masses of small sizes. The feed material may have previously been subjected to sintering (e.g., partial sintering) without yet having formed a sintered article exhibiting a desired density.

As used herein, the term "metal" means and includes an electrically conductive material that has a melting temperature ($T_m$) above about 1000° C. and is resistant to high temperatures. The metal may include, but is not limited to, a refractory metal, a rare-earth metal, or a transition metal.

As used herein, the term "sintering" means and includes a process by which a solid material (e.g., a powder material) and/or a partially sintered solid material coalesces into a porous or solid mass by the application of pressure and/or heating. The process may include applying electric current to the solid material. The sintering process may include, but is not limited to, spark plasma sintering (SPS), electric field assisted sintering (EFAS), microwave sintering, ultra-high-pressure sintering, flash sintering, electric field enhanced cold sintering (EFECS), or hot pressing.

As used herein, the term "substantially" in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

Articles having one or more channels (e.g., microchannels, flow channels) in a base material are disclosed. The channels may function as a flow path for one or more fluids through the base material. The channeled article may optionally include a coating (e.g., a microcoating) on internal surfaces of the channels. The coating may protect the base material from damage (e.g., corrosion or reactions) caused by oxidation or by contact with the fluid.

Methods of forming the articles having the channels are also disclosed. The article may be formed by additive manufacturing (e.g., 3D printing (3DP)) of one or more shapeholders, sintering of the shapeholder and a feed material, and selective removal of the shapeholder to form the channeled article. An additive manufacturing assembly may be used to form the shapeholder to exhibit a geometry that corresponds to a desired geometry (e.g., configuration) of the channels within the channeled article. The shapeholder may, for example, correspond to an inverse pattern (e.g., a negative image) of the channels. The shapeholder may be placed in a sintering assembly containing a feed material, such as a metal powder or a ceramic powder, to be sintered. The feed material may be formed around the shapeholder. Pressure and/or electric current are applied to the shapeholder and feed material in the sintering assembly to sinter the feed material around the shapeholder, forming a sintered article including the shapeholder within the base material (e.g., sintered feed material). In other words, the shapeholder may be incorporated in the base material. A solvent may be used to remove (e.g., dissolve) the shapeholder without substantially dissolving and/or substantially damaging (e.g., corroding or decomposing) the feed material or the base material. Exposing the sintered article to the solvent may form the channeled article having the channels in the base material. The solvent may also be formulated to deposit a coating material on an internal surface of the channels.

Using additive manufacturing to form the shapeholder may facilitate the formation of complex geometries of channels within the channeled article. The channels may be microstructures configured to function as cooling channels, configured for delivery of a desired fluid within the channels, or configured with other fluid flow characteristics (e.g., a desired flow rate or a desired capillary action) within the channels. The microstructural control provided by the additive manufacturing process, the sintering process, and the selective removal process may enable using a wide variety of materials as the shapeholder, base material, and/or the coating, if present, in the channeled article. The additive manufacturing process, the sintering process, and the selective removal process, in combination, may reduce costs of forming the channeled article and the energy used to form the channeled article.

Referring to FIGS. 1A and 1B, a shapeholder 100 (e.g., shapeholder 100a, shapeholder 100b) may be formed by 3DP, which enables the formation of a complex shape or complex geometry. For example, digital light processing stereolithography or direct ink writing may be used to form the shapeholder 100 in a desired shape or geometry. The shapeholder 100 may be configured to be subjected to the sintering process without breaking or being damaged. In other words, the shapeholder 100 may be resistant to process conditions used during the sintering process. Shapeholder 100 is used herein to collectively refer to shapeholder 100a, 100b or other shapeholder configuration. The shapeholder 100 may be formed layer-by-layer from a 3D computer aided design (CAD) model. However, the shapeholder 100 may be formed by processes other than additive manufacturing. The additive manufacturing process may include forming a layer from a slurry containing a shapeholder material suspended in a binder (e.g., a photocurable resin). An initial layer of the shapeholder 100 may be deposited on a foil and cured with a light with a predetermined wavelength (e.g., about 405 nanometers (nm)). The light may be configured to cure (e.g., harden) the material of the slurry. Subsequent material layers may be deposited and exposed to the light to form the shapeholder 100. The shapeholder 100 may be subjected to a debinding process (e.g., in a debinding furnace) to remove the binder (e.g., organic binders) and densify the shapeholder 100.

The shapeholder 100 may be formed of a glass material (e.g., silica), a metal material (e.g., a refractory metal, a rare-earth metal, a transition metal), a ceramic material (e.g., alumina, zirconia, yttria, yttrium stabilized zirconia (YSZ), ceria, magnesia, or a combination thereof), a metal oxide, a metal alloy, a cermet, a polymer, a composite, a functional material, a salt, or a combination thereof. The metal may, for example, be tungsten, molybdenum, tantalum, niobium, rhenium, zinc, an alloy thereof, or a combination thereof. The shapeholder 100 may include multiple materials or substructures. In some embodiments, the shapeholder 100 is formed of and includes zinc oxide.

The shapeholder 100, such as shapeholder 100a, 100b, may include at least one of a non-linear portion 102 (e.g., non-linear portion 102a, non-linear portion 102b) and/or a linear portion 104 (e.g., linear portion 104a, linear portion 104b). The non-linear portion 102 and the linear portion 104 form a pattern that corresponds to the negative image of the one or more channels in the channeled article. The linear portion 104 of the shapeholder 100 may extend from, or be substantially coplanar, with an outer portion of a base material (e.g., base material 402 shown in FIGS. 4A and 4B) of the channeled article. This may facilitate exposure of the shapeholder 100 to the solvent that selectively removes the shapeholder 100 from the base material (e.g., base material 402). The shapeholder 100 may include one or more linear portions 104 connected to one or more non-linear portions 102 to form the pattern of the shapeholder 100. As shown in FIG. 1A, the shapeholder 100a may exhibit a so-called "keyhole" shape and include non-linear portion 102a and linear portions 104a, with the non-linear portion 102a connected to the linear portions 104a. As shown in FIG. 1B, the shapeholder 100b may include a so-called "serpentine" shape including multiple non-linear portions 102b and linear portions 104b, with the linear portions 104b connected to the non-linear portions 102b. Other shapes and geometries of the shapeholder 100 are possible, depending on the number and size of channels to be formed in the channeled article. The shapes and/or geometries of the shapeholder 100 may be selected to produce the inverse pattern (e.g., the negative image) of the channels (e.g., channels 502 shown in FIGS. 5A and 5B) in the channeled article (e.g., channeled article 500 shown in FIGS. 5A and 5B).

The shapeholder 100 may be a continuous material that includes multiple interconnected segments (e.g., the non-linear portions 102 and the linear portions 104), as shown in FIGS. 1A and 1B. The shapeholder 100 may be configured as the keyhole shape 100a, the serpentine shape 100b, a circular shape, a square shape, a rectangular shape, a triangular shape, or a trapezoidal shape. The shapeholder 100 may be configured as a substantially 2-dimensional shape (e.g., formed along a single plane at a predetermined height or thickness) or the shapeholder 100 may be configured as a 3-dimensional shape (e.g., a helix). The shapeholder 100 may exhibit a cross-section that is substantially circular, tubular, ovular, square, rectangular, triangular, trapezoidal, polygonal, or irregular. The shapeholder 100 may include separate (e.g., discrete) non-linear portions 102 and linear portions 104 that, in combination, form the geometry of the shapeholder 100. Dimensions (a length, a width, a height) of the shapeholder 100 may substantially correspond to desired dimensions of the channels in the channeled article.

Figure 2:
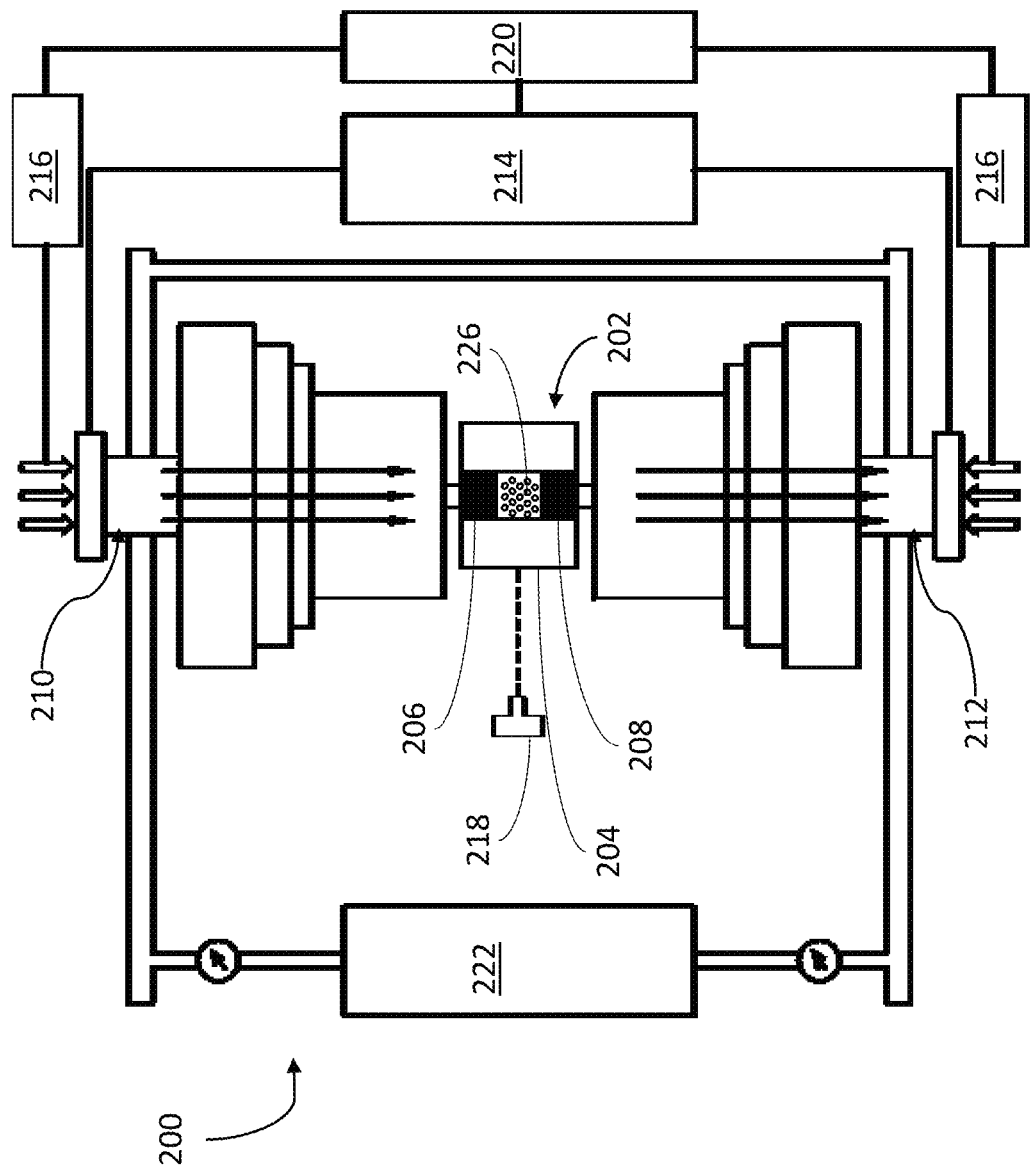
FIG. 2 is a schematic view of a sintering assembly used to sinter articles including the shapeholders of FIGS. 1A and 1B.

Referring to FIG. 2, the shapeholder 100 and a feed material 226 may be placed in a die assembly 202 of a sintering assembly 200, which includes a die 204, an upper punch 206, and a lower punch 208. The die assembly 202 may be appropriately sized and shaped to contain the shapeholder 100 and the feed material 226. The feed material 226 may be deposited to substantially surround the shapeholder 100. The die assembly 202 may be made of graphite, stainless steel, or other materials that exhibit a high melting temperature and/or high sintering temperature. The die 204 may be configured as a cylindrical component with a through hole bored between a top surface and a bottom surface. The upper punch 206 and the lower punch 208 may be configured to be received by the through hole of the die 204. The die 204, the upper punch 206, and the lower punch 208 define a cavity for receiving the shapeholder 100 and feed material 226. The shapeholder 100 and feed material 226 may be placed into the cavity, and electric current and/or pressure applied to heat the shapeholder 100, the feed material 226, and/or the die assembly 202. The feed material 226 may be positioned around the shapeholder 100, such as a powdered feed material 226 around the shapeholder 100 or a partially sintered feed material around the shapeholder 100.

The feed material 226 may be a powdered (e.g., unsintered) or partially sintered material, which is subsequently sintered to form a base material (e.g., base material 402 shown in FIGS. 4A through 5B). The feed material 226 may be a metal material (e.g., a refractory metal, a rare-earth metal, a transition metal), a metal oxide, a metal alloy, a ceramic material (e.g., alumina, silica, fumed silica, fused silica, fumed silica, zirconia, YSZ, ceria, magnesia, zirconium silicate, or a combination thereof), a cermet, a thermoelectric material, a functional material, a salt, or a combination thereof. The metal may include, but is not limited to, titanium, vanadium, chromium, manganese, zirconium, niobium, molybdenum, ruthenium, rhodium, hafnium, tantalum, tungsten, niobium, rhenium, osmium, iridium, an alloy thereof, or a combination thereof. The metal may be a recycled rare-earth material. The feed material 226 may be synthesized by conventional techniques or may be commercially available from various sources. A powdered feed material 226 may surround the shapeholder 100. Alternatively, the shapeholder 100 may, for example, be positioned on a partially sintered substrate (e.g., a partially sintered cylinder) formed of the feed material 226 with a powdered feed material 226 positioned on the shapeholder 100 and the partially sintered substrate.

In some embodiments, the shapeholder 100 is formed of silica and the feed material 226 is formed of molybdenum. In other embodiments, the shapeholder 100 is formed of zinc or zinc oxide and the feed material 226 is formed of molybdenum.

The feed material 226 may be sized as nanoparticles or as larger particles. The nanoparticles may be from about 1 nm to about 100 nm, such as from about 1 nm to about 75 nm, from about 1 nm to about 50 nm, or from about 1 nm to about 25 nm. The feed material 226 may include shape-controlled nanoparticles (e.g., shaped nanoparticles), such as spherical nanoparticles, cubic nanoparticles, rod-shaped nanoparticles, flower-like nanoparticles, plate-like (e.g., flat) nanoparticles, shell-like nanoparticles, octahedral nanoparticles, or chiral nanoparticles. The particles of the feed material 226 may include a single particle size or a distribution of particle sizes, such as a multimodal distribution of particle sizes. For example, the feed material 226 may comprise, consist essentially of, or consist of particles of substantially consistent (e.g., substantially uniform) size or may include a combination of different particle sizes, which may minimize formation of pores in the sintered article. Using multiple particle sizes of the feed material 226 may function to fill in what would otherwise be voids in interstitial spaces between the particles. For instance, smaller particles (e.g., smaller flakes) of the feed material 226 may fill the interstitial spaces between larger particles (e.g., larger flakes). The feed material 226 may include unprocessed powders or flakes of a desired base material (e.g., base material 402) or previously sintered components.

The material of the shapeholder 100 and the feed material 226 may be the same material composition (e.g., chemical composition) or a different material composition. The shapeholder 100 may, for instance, include a material from one material class and the feed material 226 may include a material from another material class. For instance, one of the shapeholder 100 and the feed material 226 may be an oxide material and the other of the shapeholder 100 and the feed material 226 may be a metal alloy. Alternatively one of the shapeholder 100 and the feed material 226 may be an oxide material and the other of the shapeholder 100 and the feed material 226 may be a metal material, one of the shapeholder 100 and the feed material 226 may be a metal oxide and the other of the shapeholder 100 and the feed material 226 may be a refractory metal, one of the shapeholder 100 and the feed material 226 may be a functional material and the other of the shapeholder 100 and the feed material 226 may be a refractory metal, or one of the shapeholder 100 and the feed material 226 may be a metal oxide and the other of the shapeholder 100 and the feed material 226 may be a refractory metal. In some embodiments, the feed material 226 and/or the material of the shapeholder 100 are zinc oxide, iron oxide, or cerium oxide.

The feed material 226 may be combined with an aqueous or a non-aqueous liquid (e.g., water, an ionic liquid, or a covalent compound) to form a solution or a suspension. The feed material 226 may be at least partially soluble in the liquid, such that the liquid and the feed material 226 form the solution or suspension. The liquid may facilitate the dissolution and reprecipitation of the feed material 226 during the sintering process, such as facilitating particle rearrangement of the feed material 226. The ionic liquid may be a hydrophobic ionic liquid, a polarizable ionic liquid, an electrically conductive ionic liquid, or a combination thereof. The ionic liquid may be a liquid at room temperature. The ionic liquid may be an imidazolium ionic liquid, a piperidinium ionic liquid, a phosphonium ionic liquid, or a combination thereof. The ionic liquid may include, but is not limited to, 1-methylimidazolium triflate, 1-butyl-3-methylimidazolium chloride, 1-allyl-3-methylimidazolium chloride, 1-ethylimidazolium triflate, 1-butyl-3-methylimidazolium triflate, or a combination thereof. In some embodiments, the liquid is an ionic liquid. In other embodiments, the liquid is water.

Without being bound by any theory, selecting the shape and the size of the feed material 226 may facilitate smaller minimum grain sizes in the sintered article by limiting mass transport of the particles in the sintering process. The use of selectively shaped nanoparticles may facilitate self-alignment of the nanoparticles within the die assembly 202 during the sintering process. The self-alignment of the nanoparticles may help to produce sintered articles substantially by surface diffusion bonding between adjacent particles. Pores between the materials may be filled with reduced mass transport of the particles to form the sintered article having a desired density. Accordingly, the sintered article may be formed at lower process temperatures, pressures, and/or sintering times. FIG. 3A shows an enlargement of a feed material 226a positioned within the die assembly 202, with the feed material 226a including particles of varying sizes and/or shapes. The varying sizes and/or shapes of the feed material 226a may result in large interstitial spaces (e.g., pores) between the particles during the sintering process. Accordingly, the particles of the feed material 226a may be subjected to greater mass transport during the sintering process to fill the interstitial spaces between the particles. The sintered article formed from the feed material 226a may exhibit increased grain growth during the sintering process. FIG. 3B shows an enlargement of shape-controlled nanoparticles 226b positioned within the die assembly 202, with the shape-controlled nanoparticles including particles having a substantially similar size and/or shape. The shape-controlled nanoparticles 226b may be cubic nanoparticles, octahedral nanoparticles, or other desired shape. The shape-controlled nanoparticles 226b may self-align during the sintering process, reducing the interstitial spaces (e.g., pores) between particles. Mass transport (e.g., deformation) of the shape-controlled nanoparticles 226b during the sintering process may be reduced compared to the feed material 226a. Accordingly, the shape-controlled nanoparticles 226b may be formed into a sintered article having a desired density using reduced pressures, process temperatures, and/or sintering times compared to sintered articles formed with the feed material 226a.

The methods according to embodiments of the disclosure may facilitate the co-sintering of the shapeholder 100 and the feed material 226. By appropriately selecting the desired shape and size of the feed material 226 and/or providing the feed material 226 in solution or suspension, the sintering of the feed material 226 may be achieved at a reduced process temperature. For example, the feed material 226 and/or shapeholder 100 may be sintered at a temperature of from about 10% of the melting temperature of the feed material 226 and/or shapeholder 100 to less than or equal to about 30% of the melting temperature of the feed material 226 and/or shapeholder 100, such as less than or equal to about 25%, less than or equal to about 20%, less than or equal to about 15%, or less than or equal to about 12%. For example, refractory metals exhibiting a melting temperature of greater than or equal to about 2000° C., such as from about 2700° C. to about 3700° C., may be co-sintered at a process temperature of less than or equal to about 1,110° C., such as from about 810° C. to about 1,110° C., from about 540° C. to about 740° C., or from about 270° C. to about 370° C.

The feed material 226 and the shapeholder 100 may be placed in the die assembly 202 of the sintering assembly 200 and subjected to process conditions (e.g., sintering conditions) that form a sintered article (e.g., sintered article 400 shown in FIGS. 4A and 4B). During the sintering process, the feed material 226 and the shapeholder 100 are co-sintered to form the sintered article including the shapeholder 100 substantially encapsulated by the sintered feed material 226 (e.g., base material 402). While the sintering process is described with reference to the sintering assembly 200, other assemblies configured to apply pressure and electrical current to the feed material 226 and the shapeholder 100 may be used. The sintering conditions cause the feed material 226 to heat and densify around the shapeholder 100, incorporating the shapeholder 100 into the base material 402. After applying the pressure and/or electric current, the sintered article may be removed from the die assembly 202.

During the sintering process, pressure and/or electrical current (e.g., pulsed or unpulsed direct current (DC) or alternating current (AC)) are applied across the shapeholder 100 and the feed material 226 in a controlled environment (e.g., an environment in which pressure and temperature may be controllable). The application of pressure may compact the feed material 226 around the shapeholder 100. The application of the electrical current may generate heat internally within the shapeholder 100 and the feed material 226. External heat may also be applied within the controlled environment. In some embodiments, no external heat is applied to the shapeholder 100 and/or feed material 226. The shapeholder 100 may remain a substantially continuous material during the sintering process, with the shapeholder 100 exhibiting little to no shrinkage during the sintering process. By way of example only, the shapeholder 100 may exhibit less than or equal to about 5% shrinkage, less than or equal to about 3% shrinkage, or less than or equal to about 1% shrinkage. The sintered article 400 may be cooled by a cooling system 222 or may cool slowly by dissipating heat to the surrounding environment before removal from the sintering assembly 200.

The sintering assembly 200 may apply pressure (e.g., compressive force) to the punch (e.g., upper punch 206, lower punch 208), and across the shapeholder 100 and feed material 226 under constraint of the die assembly 202. The sintering assembly 200 may include a mechanism for applying pressure, such as a power-fluid system 216 (e.g., a pneumatic system or hydraulic system) coupled to the upper punch 206 and the lower punch 208. The power-fluid system 216 may apply pressure to the feed material 226 through the upper punch 206 and/or lower punch 208. The applied pressure may be from about 0 mega pascals (MPa) to about 300 MPa, such as from about 0 MPa to about 300 MPa, from about 0 MPa to about 250 MPa, from about 0 MPa to about 200 MPa, from about 0 MPa to about 150 MPa, from about 0 MPa to about 100 MPa, or from about 0 MPa to about 50 MPa.

After or at substantially the same time as applying the pressure, the sintering assembly 200 may apply an electric current across the shapeholder 100 and the feed material 226. The sintering assembly 200 may include an upper electrode 210 electrically coupled to the upper punch 206 and a lower electrode 212 electrically coupled to the lower punch 208. The electric current may be applied to one of the upper punch 206 and the lower punch 208, flow through the upper punch 206 or lower punch 208, across the shapeholder 100 and/or the feed material 226, and out the other of the upper punch 206 and the lower punch 208. The magnitude of electric current applied to the die assembly 202 and consequently, across the shapeholder 100 and/or feed material 226 may depend on the desired process temperature to which the shapeholder 100 and/or feed material 226 are to be heated. The sintering process may use the electric current to heat the shapeholder 100 and/or feed material 226 by so-called "Joule Heating." The magnitude of applied electric current may be selected depending on the properties of the shapeholder 100 and/or feed material 226, the geometry of the die assembly 202, the geometry of the upper punch 206, the geometry of the lower punch 208, the size of the shapeholder 100 and the amount of feed material 226 to be sintered. The electric current may be initiated by a current controller 214 of the sintering assembly 200. The electrical current applied during the sintering process may range from about 0 amps (A) to about 150,000 A, such as from about 0 A to about 20 A, from about 5 A to about 20 A, from about 10 A to about 20 A, from about 15,000 A to about 145,000 A, from about 30,000 A to about 120,000 A, from about 45,000 A to about 105,000 A, or from about 50,000 A to about 100,000 A.

The process temperature may correspond to one or more of a temperature of the die 204 or a temperature of the shapeholder 100 and/or feed material 226. The process temperature generated by the applied electric current may depend on the resistivity and the thickness of the material of the die assembly 202 (e.g., the die 204, the upper punch 206, and the lower punch 208), the geometry of the die assembly 202, and the material composition of the shapeholder 100 and/or the feed material 226. The process temperature may be from about 150° C. to about 1,250° C., such as from about 150° C. to about 1,000° C., from about 150° C. to about 750° C., about 150° C. to about 500° C., or from about 150° C. to about 300° C.

The sintering process may include adjusting the electric current and pressure to maintain a predetermined heating rate. For example, the heating rate may be in a range of from about 1° C. per minute (° C./min) to about 300° C./min, such as from about 10° C./minute to about 250° C./min, from about 50° C./minute to about 200° C./minute, or from about 75° C./minute to about 175° C./minute. The heating may be monitored by a pyrometer 218 external to the die assembly 202. Additionally, or alternatively, the sintering process may include adjusting the electric current and pressure to maintain the process temperature for a pre-determined amount of time (e.g., hold time). The hold time may range from about 1 minute (min) to about 180 min, such as from about 1 minute to about 90 minutes, from about 1 minute to about 60 minutes, from about 1 minute to about 30 minutes, from about 1 minute to about 15 minutes, from about 1 minute to about 10 minutes, or from about 1 minute to about 5 minutes. The application and adjustment of both electric current and pressure may be controlled by a system controller 220, which is operably coupled to the current controller 214, the power-fluid system 216, and the pyrometer 218.

Additional process parameters, such as bonding atmosphere, may be selected to achieve desired material properties of the sintered article 400, such as a surface finish. For example, the shapeholder 100 and the feed material 226 may be positioned in the die assembly 202, and the sintering assembly 200 may be evacuated and back filled with argon, helium, or another inert gas to provide a desired surface finish of the sintered article 400. The evacuated pressure of the sintering assembly 200 may be in the range of from about $1\times10^{-2}$ Torr to about $1\times10^{-3}$ Torr.

The sintered article (e.g., the sintered article 400) produced using the methods according to embodiments of the disclosure may be formed using a lower energy usage than similar articles formed by conventional sintering methods. The energy used to produce the sintered article 400 may be less than or equal to about 0.5 kilowatt hours per gram (kWh/g), such as less than or equal to about 0.4 kWh/g, less than or equal to about 0.3 kWh/g, less than or equal to about 0.2 kWh/g, or less than or equal to about 0.1 kWh/g.

FIGS. 4A and 4B show the sintered article 400 including the shapeholder 100*a* and base material 402, which is formed by sintering the feed material 226. While FIGS. 4A and 4B depict the sintered article 400 as including the shapeholder 100*a*, other configurations of the shapeholder 100 (e.g., shapeholder 100*b*) may be used. The base material 402 is a solid material resulting from the sintering process and substantially surrounds the shapeholder 100*a*. The sintered article 400 may exhibit a high density. For example, the density of the sintered article 400 may be greater than or equal to about 90% of a theoretical maximum density of the base material 402, greater than or equal to about 95% of a theoretical maximum density of the base material 402, greater than or equal to about 97% of a theoretical maximum density of the base material 402, greater than or equal to about 98% of a theoretical maximum density of the base material 402, or greater than or equal to about 99% of a theoretical maximum density of the base material 402. The high density of the base material 402 after the sintering process may reduce or eliminate post-sintering process acts, which reduces the complexity of forming the sintered article 400 and channeled article 500 compared to conventional techniques of forming similar articles.

As shown in FIGS. 4A and 4B, a portion of the linear portion 104*a* of the shapeholder 100*a* may be exposed, such as extending from an outer surface of the base material 402 or being substantially coplanar (e.g., flush) with the outer surface of the base material 402. Alternatively, a portion of the sintered article 400 (e.g., a portion of the base material 402) may be removed, such as by subtractive manufacturing or machining, to expose the linear portion 104*a*. Similarly, if the shapeholder 100*b* is used, the linear portion 104*b* may extend from or be coplanar with the base material 402.

Figures 5A, 5B:
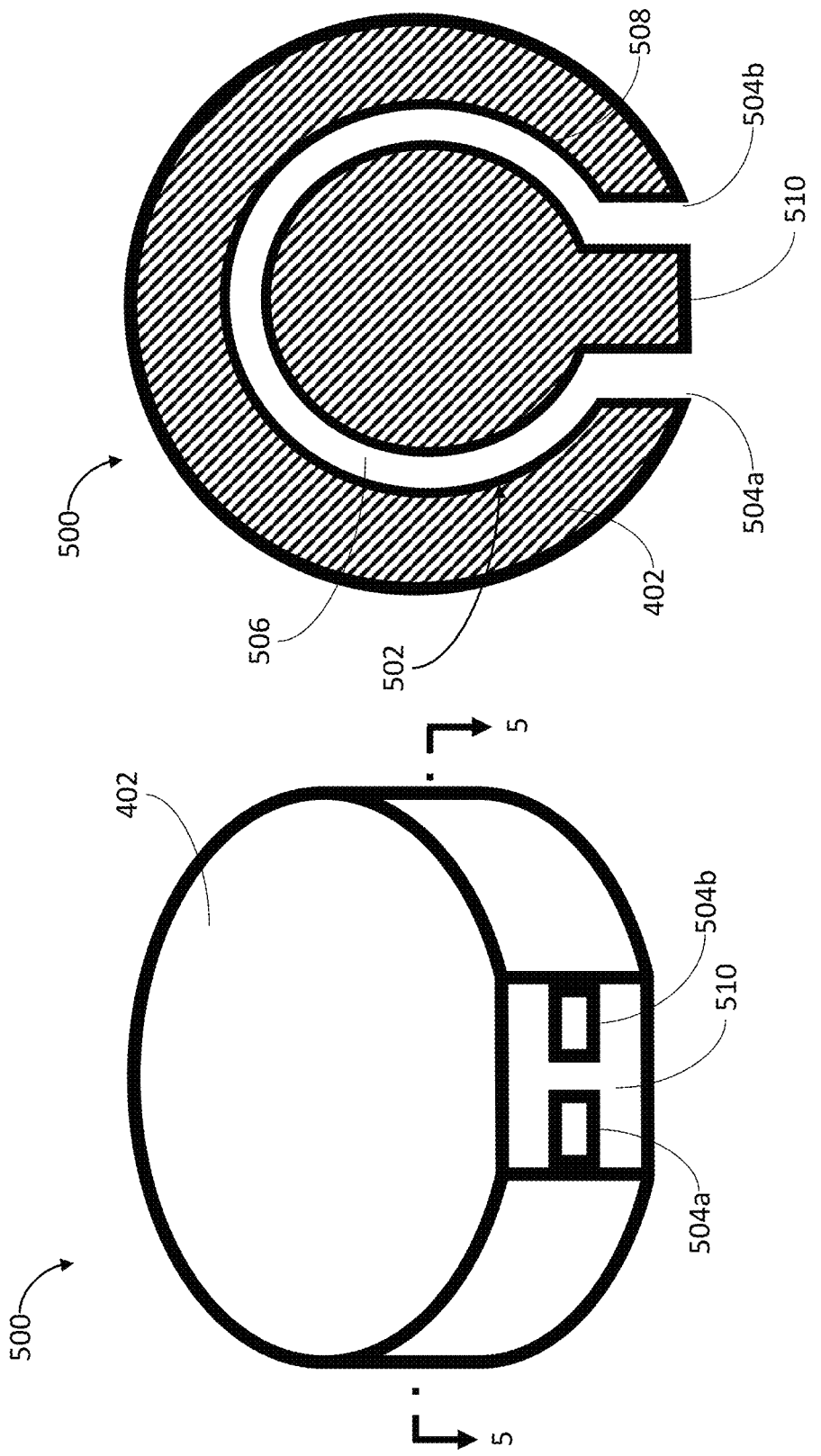
FIG. 5A is a perspective view of a channeled article having a channel in the base material of the sintered article of FIG. 4A.
FIG. 5B is a cross sectional view of the channeled article of FIG. 5A taken along line 5-5.

To form the channeled article 500, as shown in FIGS. 5A and 5B, the sintered article 400 may be exposed to a solvent (e.g., an ionic liquid or covalent compound) configured to selectively dissolve the shapeholder 100*a* without damaging the base material 402. In other words, the solvent may be chemically inert to the base material 402. The solvent may dissolve the exposed linear portion 104*a* and form one or more openings (e.g., openings 504*a*, 504*b*) in the sintered article 400 through which additional solvent may enter and/or exit. The openings 504*a*, 504*b* may facilitate the flow of the solvent through the sintered article 400. The openings 504*a*, 504*b* may have a substantially similar cross-sectional area as one another or the openings 504*a*, 504*b* may have different cross-sectional areas. As the solvent dissolves the shapeholder 100*a*, a flow path (e.g., flow path 506) is defined in the channeled article 500. The solvent is used to form the flow path 506 by removing the linear portions 104*a* and the non-linear portions 102*a* of the shapeholder 100*a*, defining one or more channels 502 in the channeled article 500. Substantially all of the shapeholder 100*a* may be removed from the sintered article 400 by exposing the shapeholder 100*a* to the solvent for a sufficient amount of time. For instance, greater than about 95% of the shapeholder 100*a* may be removed from the sintered article 400, such as greater than about 97%, greater than about 99%, or greater than about 99.5%. While FIGS. 5A and 5B show the removal of the shapeholder 100*a*, the removal of differently shaped shapeholders 100, such as shapeholder 100*b*, may be conducted similarly.

The solvent used to remove the shapeholder 100 may be a non-aqueous solvent. The solvent may be an ionic liquid, a mineral acid (e.g., hydrogen fluoride (HF)), an organic acid, a base, or a combination thereof formulated to selectively remove the shapeholder 100 without substantially removing the base material 402. The ionic liquid may be a liquid at room temperature and may be a hydrophobic ionic liquid or a conductive ionic liquid. The ionic liquid may be an imidazolium ionic liquid, a piperidinium ionic liquid, a phosphonium ionic liquid, or a combination thereof. The ionic liquid may include, but is not limited to, 1-methylimidazolium triflate, 1-butyl-3-methylimidazolium chloride, 1-allyl-3-methylimidazolium chloride, 1-ethylimidazolium triflate, 1-butyl-3-methylimidazolium triflate, or a combination thereof.

The shapeholder 100 may be removed using a solution of an ionic liquid and an organic solvent, such as acetone, acetonitrile, or methanol, or a solution of the ionic liquid and a molecular electrolyte solvent, such as acetonitrile, propylene carbonate, tetrahydrofuran, or diethyl carbonate. The solution may include from about 1 percent by weight (wt %) to about 50 wt % of the ionic liquid, such as from about 10 wt % to about 40 wt % of the ionic liquid or from about 20 wt % to about 30 wt % of the ionic liquid, with the remaining portion of the solution being the organic solvent or the molecular electrolyte solvent. The solvent may be selected to achieve desired properties such as lubricity, hydrogen bonding tunability, thermal stability, polarizability, electrical conductivity, metal loading capacity, metal binding specificity, or a combination thereof. The shapeholder 100 may be selectively removed at a temperature of from about 20° C. to about 100° C., such as from about 30° C. to about 90° C., from about 50° C. to about 80° C., or from about 60° C. to about 75° C. In some embodiments, the solvent removes the shapeholder 100 at room temperature (from about 20° C. to about 30° C.).

As shown in FIGS. 5A and 5B, the shapeholder 100*a* may be substantially completely removed from the sintered article 400 to form the channeled article 500. The channeled article 500 includes the base material 402 defining at least one channel 502 therein. The channel 502 may be defined by internal surfaces 508 of the base material 402 following the selective removal of the shapeholder 100. A diameter of the channel 502 may be from about 5 μm to about 10 mm, such as from about 10 μm to about 5 mm, from about 50 μm to about 1 mm, from about 100 μm to about 750 μm in diameter, or from about 150 μm to about 500 μm. While FIGS. 5A and 5B show the channel 502 as having a substantially uniform diameter along its length, the channel 502 may have a varying diameter at different locations along its length. The one or more channels 502 may define one or more flow paths 506 through the channeled article 500, with the one or more channels 502 configured to provide fluid to or receive fluid. The flow path 506 may include multiple interconnected flow paths or the flow path 506 may be configured as multiple discrete (e.g., separate) flow paths.

The external surface of the channeled article 500 may include an interface 510 between the one or more openings 504a, 504b. The interface 510 may be formed in the channeled article 500 during the sintering process or it may be formed by machining (e.g., subtractive manufacturing). The interface 510 may be configured to match or couple to an interface of another article. The interface 510 and/or openings 504a, 504b may be configured to match an interface and/or openings of another channeled article to facilitate the flow of fluid between the channeled article 500 and the other channeled article. The channeled article 500 may include a number of interfaces 510 matching the number of openings 504a, 504b.

The channel 502 may function as a fluid path for a fluid (e.g., a heat transfer fluid, a cooling fluid) during use and operation of the channeled article 500. The channel 502 may be configured for the delivery of fluids within or through the base material 402. The channel 502 may be configured with one or more internal features formed on an internal surface 508 thereof. The internal features may affect the flow of the fluid through the channel 502. The channel 502 may, for example, include ridges or other patterns on the internal surface 508 of the channel 502 to transfer heat or condense fluids within the channel 502. Alternatively, the channel 502 may include wicking structures (e.g., ridges or sub channels) on the internal surface 508 to promote capillary movement (e.g., movement via capillary action) of the fluid within the channel 502. The channel 502 may include fins, dimples, turbulators, baffles, or other features formed on the internal surface 508 of the channel.

A coating (not shown) may, optionally, be formed on the internal surface 508 of the channel 502. The coating may function as an environmental barrier coating (EBC) within the channel 502, protecting the base material 402 from corrosion or from reacting with the fluid flowing through the channel 502. The coating may be formed from a material of the shapeholder or from a solvent. For instance, a solvent may be used to form the coating on the internal surface 508 of the channel 502. The same solvent may be used to both dissolve the shapeholder 100a and form the coating on the internal surface 508 of the channel. The solvent may be formulated to remove the shapeholder 100a and redeposit a portion of the material of the shapeholder 100a within the channel 502 to form the coating. If, for example, the shapeholder 100a is formed of a metal, the coating may be formed of the metal of the shapeholder 100a or of a metal oxide of the metal if the metal is oxidized after redeposition in the channel 502 (e.g., by anodizing the metal). The coating in the channel 502 may also be repairable by selective removal of a damaged portion of the coating and/or deposition of an additional material to reform the coating within the channel 502. By way of example only, the coating may be a rare-earth metal (e.g., yttrium), a refractory metal (e.g., tungsten, molybdenum, tantalum, niobium, or rhenium), a transition metal (e.g., zinc), or an oxide thereof.

The solvent may be configured to act as a redox reaction medium with metal ions of the shapeholder 100 or of the base material 402 to be reduced, oxidized, selectively chelated, selectively deposited, or a combination thereof. A potentiostat and anode/cathode electrode assembly may be used to perform redox dissolution of the shapeholder 100a and/or the selective deposition of the coating without dissolving the base material 402. The base material 402 may act as the cathode and a source of the desired coating material (e.g., a material source) may be supplied as the anode. By way of example only, a zinc source of the coating to be deposited may be zinc metal, a zinc salt (e.g., zinc acetate, zinc chloride, zinc triflate), zinc oxide, or a combination thereof. The potentiostat may be coupled to the base material 402 and the material source to maintain an electrical potential between the base material 402 and the material source to facilitate the dissolution of the material source in the solvent and the subsequent deposition of the dissolved material on the base material 402 (e.g., the internal surface 508 of the channel 502). The solvent may be used to deposit (e.g., electrodeposit) a metal or metal oxide coating in the channel 502 of the channeled article 500 from a metal source. The material source may include the shapeholder 100a. The solvent may be selected to provide a wide electrochemical window so that the solvent remains stable and does not decompose during the redox reaction. The electrochemical window may be the difference between a cathodic limit and an anodic limit of the solvent. The electrochemical window may be greater than about 2 Volts (V) at 100° C., such as greater than about 2.5 V, greater than about 3 V, greater than about 3.5 V, or greater than about 4 V. The solvent may be configured to have an appreciable loading capacity (e.g., a high potential saturation) for the coating source. The loading capacity may be equal to or greater than about 1 mole per liter (mol/L), such as equal to or greater than about 5 mol/L, equal to or greater than about 10 mol/L, or equal to or greater than about 15 mol/L.

The solvent used to deposit the coating in the channel 502 may be the same as or different from the solvent used to remove the shapeholder 100a. The solvent may be one of the solvents described above for removing the shapeholder 100a. The solvent may be used to deposit a coating within the channel 502, to remove an existing coating from the channel 502, or a combination thereof. A solvent system including an ionic liquid and a non-aqueous molecular electrolyte solvent (e.g., acetonitrile, propylene carbonate, tetrahydrofuran, or diethyl carbonate) may be used to deposit the coating within the channel 502, to remove an existing coating from the channel 502, or a combination thereof.

FIG. 6 shows a process 600 for forming a channeled article (e.g., channeled article 500) according to embodiments of the disclosure. The process includes forming 602 a shapeholder (e.g., shapeholder 100). As previously described, the shapeholder may exhibit a variety of shapes, sizes, and configurations and may be formed by a variety of techniques. The shapeholder may, for example, be formed by additive manufacturing, such as by 3DP.

The shapeholder is incorporated 604 into a feed material (e.g., feed material 226). The feed material may be provided as a solid, unsintered material or a solid, partially sintered material and the shapeholder may be positioned on or in the feed material. The feed material may substantially surround the shapeholder. The feed material may comprise a powder, a partially sintered solid, or a combination thereof. The feed material may, for example, include shape-controlled nanoparticles. The feed material may be combined with a liquid (e.g., an ionic liquid).

The feed material and the shapeholder are sintered 606 to form a sintered article (e.g., sintered article 400). The feed material and the shapeholder may be sintered using a sintering assembly (e.g., sintering assembly 200). Sintering 606 the feed material and the shapeholder forms the sintered article including a base material (e.g., base material 402)

surrounding the shapeholder. After the sintering process is completed, the sintered article may be removed from the sintering assembly.

The shapeholder may be selectively removed 608 from the sintered article, forming a channeled article (e.g., channeled article 500). The shapeholder may be removed by exposing the sintered article (e.g., sintered article 400) to a solvent. The solvent may be selected to remove the shapeholder without substantially damaging (e.g., dissolving or corroding) the base material. The solvent may include but is not limited to an ionic liquid or a covalent compound. Removing the shapeholder from the base material defines one or more channels (e.g., channel 502) in the base material.

The solvent (or another solvent) may be formulated to, optionally, form 610 a coating within the channel. The coating may be formed on internal surfaces (e.g., internal surface 508) of the channel. The solvent used to remove the shapeholder from the base material (e.g., base material 402) may be formulated to deposit the coating during the removal process. Alternatively, another solvent may be used to deposit the coating. The optional coating may be an environmental barrier coating (EBC) configured to protect the base material of the channeled article from damage.

The channeled article may, optionally, be exposed to another solvent to repair 612 the coating within the channel. The coating may be repaired 612 by exposing the channel to the solvent formulated to deposit a material on the internal surfaces of the channel. The solvent may remove a corroded or damaged portion of the coating and deposit additional material to repair the coating. The solvent may remove substantially all of the coating and deposit a new coating within the channel.

The methods according to embodiments of the disclosure may be used to form channeled articles useful in the aerospace and land-based power turbine industries. The channeled article may, for instance, be used for clean energy applications. By way of example only, the article may be a turbine blisk, a turbine blade, or a turbulator having channels therein. The channeled articles formed by the methods according to embodiments of the disclosure may exhibit little or zero part shrinkage. The channeled articles may be formed using larger dies in the sintering tool assembly. Various sizes and shapes of the channels may be formed within the channeled article.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the following appended claims and their legal equivalent. For example, elements and features disclosed in relation to one embodiment may be combined with elements and features disclosed in relation to other embodiments of the disclosure.

What is claimed is:

1. A method of forming an article, comprising:
    forming a feed material around one or more shapeholders;
    sintering the feed material and the one or more shapeholders to form a sintered article comprising the one or more shapeholders in a base material; and
    exposing the sintered article to a solvent to remove the one or more shapeholders from the base material.

2. The method of claim 1, wherein forming a feed material around one or more shapeholders comprises substantially surrounding the one or more shapeholders with the feed material.

3. The method of claim 1, wherein forming a feed material around one or more shapeholders comprises forming a feed material comprising a refractory metal around the one or more shapeholders, the one or more shapeholders comprising a metal oxide.

4. The method of claim 1, wherein sintering the feed material and the one or more shapeholders comprises co-sintering the feed material and the one or more shapeholders at a temperature less than or equal to about 30% of a melting temperature of the feed material.

5. The method of claim 1, wherein exposing the sintered article to a solvent to remove the one or more shapeholders comprises exposing the sintered article to a non-aqueous solvent.

6. The method of claim 1, wherein exposing the sintered article to a solvent to remove the one or more shapeholders comprises exposing the sintered article to an ionic liquid comprising 1-methylimidazolium triflate, 1-butyl-3-methylimidazolium chloride, 1-allyl-3-methylimidazolium chloride, 1-ethylimidazolium triflate, 1-butyl-3-methylimidazolium triflate, or a combination thereof.

7. The method of claim 1, wherein exposing the sintered article to a solvent to remove the one or more shapeholders from the base material comprises forming one or more microchannels in the base material.

8. The method of claim 7, wherein forming one or more microchannels in the base material comprises forming the one or more microchannels corresponding to a negative image of the one or more shapeholders in the base material.

9. The method of claim 7, further comprising depositing a coating within the one or more microchannels.

10. The method of claim 9, wherein depositing a coating within one or more microchannels comprises redepositing a material of the one or more shapeholders within the one or more microchannels.

11. The method of claim 9, wherein depositing a coating within the one or more microchannels comprises exposing the one or more channels to another solvent.

12. A method of forming a channeled article, comprising:
    forming one or more shapeholders by additive manufacturing;
    forming a feed material around the one or more shapeholders;
    applying one or more of pressure or electrical current to the feed material and the one or more shapeholders to form a sintered article comprising the one or more shapeholders within a base material; and
    exposing the sintered article to an ionic liquid to remove the one or more shapeholders from the base material to form one or more microchannels in the base material, the one or more microchannels corresponding to a negative image of the one or more shapeholders.

13. The method of claim 12, wherein applying one or more of pressure or electrical current to the feed material and the one or more shapeholders to form a sintered article comprises applying one or more of pressure or electrical current across the feed material and the one or more shapeholders.

14. The method of claim 12, wherein applying one or more of pressure or electrical current to the feed material and the one or more shapeholders to form a sintered article comprises co-sintering the feed material and the one or more shapeholders in a die assembly of a sintering assembly.

15. The method of claim 12, wherein exposing the sintered article to an ionic liquid to form one or more microchannels in the base material comprises substantially completely removing the one or more shapeholders from the base material.

16. The method of claim 12, wherein exposing the sintered article to an ionic liquid to form one or more microchannels in the base material comprises selectively removing the one or more shapeholders from the base material.

17. The method of claim 12, further comprising exposing the channeled article to a solvent to form a coating on an internal surface of the one or more microchannels.

* * * * *

UNITED STATES PATENT AND TRADEMARK OFFICE
CERTIFICATE OF CORRECTION

PATENT NO. : 12,138,687 B2
APPLICATION NO. : 18/486790
DATED : November 12, 2024
INVENTOR(S) : Donna P. Guillen et al.

Page 1 of 1

It is certified that error appears in the above-identified patent and that said Letters Patent is hereby corrected as shown below:

In the Specification
Column 4, Line 3, change "temperature (T m) above" to --temperature ($T_m$) above--
Column 10, Lines 27-28, change "from about OA to about" to --from about 0A to about--

In the Claims
Claim 5, Column 16, Lines 17-18, change "to a non- aqueous solvent." to --to a non-aqueous solvent.--

Signed and Sealed this
Eleventh Day of March, 2025

Coke Morgan Stewart
*Acting Director of the United States Patent and Trademark Office*